United States Patent
Itsuno

(10) Patent No.: US 9,656,171 B2
(45) Date of Patent: May 23, 2017

(54) COMPUTER DEVICE, STORAGE MEDIUM, AND CONTROL METHOD

(71) Applicant: CAPCOM CO., LTD, Osaka (JP)

(72) Inventor: Hideaki Itsuno, Osaka (JP)

(73) Assignee: CAPCOM CO., LTD (JP)

( * ) Notice: Subject to any disclaimer, the term of this patent is extended or adjusted under 35 U.S.C. 154(b) by 242 days.

(21) Appl. No.: 14/389,494

(22) PCT Filed: Mar. 28, 2013

(86) PCT No.: PCT/JP2013/002140
§ 371 (c)(1),
(2) Date: Sep. 30, 2014

(87) PCT Pub. No.: WO2013/145760
PCT Pub. Date: Oct. 3, 2013

(65) Prior Publication Data
US 2015/0072785 A1    Mar. 12, 2015

(30) Foreign Application Priority Data
Mar. 30, 2012  (JP) ................. 2012-078636

(51) Int. Cl.
A63F 13/00      (2014.01)
A63F 13/58      (2014.01)
(Continued)

(52) U.S. Cl.
CPC ............ *A63F 13/58* (2014.09); *A63F 13/358* (2014.09); *A63F 13/67* (2014.09); *A63F 13/798* (2014.09);
(Continued)

(58) Field of Classification Search
CPC .................. A63F 13/833; A63F 13/00
See application file for complete search history.

(56) References Cited

U.S. PATENT DOCUMENTS

2004/0097287 A1    5/2004  Postrel
2007/0060234 A1    3/2007  Yamada et al.
(Continued)

FOREIGN PATENT DOCUMENTS

AU    2007240211    6/2008
CN    101199901     6/2008
(Continued)

OTHER PUBLICATIONS

Supplementary European Search Report from Application No. EP 13 76 7696.
(Continued)

*Primary Examiner* — James S McClellan
*Assistant Examiner* — Syvila Weatherford
(74) *Attorney, Agent, or Firm* — Bracewell LLP

(57) ABSTRACT

Embodiments of computers, non-transitory mediums having one or more computer programs stored therein, and methods are provided to enable multiple users of a video game to defeat a character in a fight. Embodiments of a computer device include, for example, a communication module, an enemy vitality management module, a fight application accepting module, an enemy vitality determination module, first mode execution module, a second mode execution modules, a first enemy vitality transmission module, and an enemy vitality updating module. Embodiments of the computer device operate in a first mode when a vitality number of a gaming character is greater than a predetermined value, and a second mode when the number is less than or equal to the predetermined value. Updates to the vitality number are enabled only in the first execution mode according to an embodiment of the invention.

7 Claims, 6 Drawing Sheets

(51) Int. Cl.
*A63F 13/847* (2014.01)
*A63F 13/67* (2014.01)
*A63F 13/822* (2014.01)
*A63F 13/798* (2014.01)
*A63F 13/358* (2014.01)

(52) U.S. Cl.
CPC .......... *A63F 13/822* (2014.09); *A63F 13/847* (2014.09); *A63F 2300/558* (2013.01); *A63F 2300/6027* (2013.01); *A63F 2300/807* (2013.01); *A63F 2300/8029* (2013.01)

(56) References Cited

U.S. PATENT DOCUMENTS

| | | | |
|---|---|---|---|
| 2008/0200226 A1 | 8/2008 | Ichimura | |
| 2011/0077078 A1* | 3/2011 | Taoka | A63F 13/10 463/31 |
| 2011/0190063 A1 | 8/2011 | Kajii | |

FOREIGN PATENT DOCUMENTS

| | | |
|---|---|---|
| EP | 1757346 | 2/2007 |
| EP | 1933284 | 6/2008 |
| JP | 2004329779 | 11/2004 |
| JP | 200754171 | 3/2007 |
| JP | 2008142352 | 6/2008 |
| JP | 201130892 | 2/2011 |
| KR | 20080053904 | 6/2008 |
| TW | 200831170 | 8/2008 |

OTHER PUBLICATIONS

Studio Bent Stuff Co., Ltd., 'Final Fantasy X-2 Ultimania', 6th print, Square Enix Co., Ltd., Jun. 15, 2005 (Jun. 15, 2005), p. 526 (paragraph of 'Ultimania column [Training ni yoru Parameter no Henke]').

"Monster Hunter Portable 2ndG Official Guidebook," Enterbrain, Inc., Aug. 1, 2008, p. 34-35.

International Search Report for PCT/JP2013/002140, Jun. 24, 2013. (2 pages).

* cited by examiner

COMPUTER DEVICE, STORAGE MEDIUM, AND CONTROL METHOD

RELATED APPLICATION

This application is related to and claims priority and benefit to PCT/JP2013/002140 filed on Mar. 28, 2013, titled (translated) "Computer Device, Storage Medium, and Control Method," which claims priority and benefit to Japanese Patent Application No. 2012-078636 filed on Mar. 30, 2012, titled (translated) "Computer Device, Storage Medium, and Control Method," each of which is incorporated by reference in its entirety.

FIELD OF THE INVENTION

The present invention relates to a computer device, a storage medium, and a control method of implementing a game in that a player character has a fight with an enemy character in a virtual game space.

BACKGROUND OF THE INVENTION

Conventionally, a game such as an action game or a role-playing game proceeds in such a manner that a player character is caused to act within a virtual game space in response to a user's manipulation. In this kind of game, plural game devices can be connected to each other via communication lines and plural users can cooperate with each other to fight with an enemy character. See e.g., Monster Hunter Portable 2ndG Official Guidebook," Enterbrain, Inc., Aug. 1, 2008, p. 34-35 (hereinafter "Monster Hunter"). In the game of Monster Hunter, player characters manipulated by multiple players cooperate with each other to fight an enemy character that appears in the virtual game space. In this fight, each player character makes an attack corresponding to its ability on the enemy character. The enemy character reduces its vitality according to damage to the enemy character. At a time point when the vitality reaches zero, the enemy character is beaten.

SUMMARY OF THE INVENTION

Embodiments of the invention enable players of multiplayer video games to cooperate with each other to defeat a gaming character. Embodiments of the present invention enable multiple players to share in the satisfaction of defeating an enemy character despite not delivering the finishing blow to the character. As the number of users who participate in the fight increases, a probability that a user can give a finishing blow to the enemy character decreases and often results in users becoming unmotivated to participate in such a fight. Problems also arise when several users play the game at the same time and access to one or more server devices becomes overloaded. Applicant has recognized problems associated with multiplayer video games and has advantageously developed computer-implemented methods, systems, computer devices and non-transitory computer-readable mediums having one or more computer programs stored therein to enable multiple users of a video game to defeat a character in a fight. Embodiments of the invention, among other things, enable more users to feel satisfied with beating an enemy character in a fight and receive more enjoyment out of game.

Embodiments of the invention include, for example, a computer adapted to enable multiple gamer users to fight a character in a virtual game, the computer comprising: one or more processors; one or more input and output units in communication with one or more processors and positioned to receive communications; and one or more non-transitory mediums in communication with the one or more processors. The one or more non-transitory mediums comprise, for example: a management module including computer-readable instructions stored therein that when executed cause the one or more processors to perform the step of managing a vitality number of a gaming character adapted to act within a virtual game space generated in one or more of a plurality of gaming devices; a communication module including computer-readable instructions stored therein that when executed cause the one or more processors to perform the step of: communicating with one or more of the plurality of gaming devices; an accepting module including computer-readable instructions stored therein that when executed cause the one or more processors to perform the step of processing an application to fight the gaming character from the one or more of the plurality of gaming devices; a determination module including computer-readable instructions stored therein that when executed cause the one or more processors to perform the step of determining whether the vitality number of the gaming character is greater than a predetermined value; a first mode module including computer-readable instructions stored therein that when executed cause the one or more processors to perform the step of executing a first mode of a game responsive to the vitality number of the gaming character being greater than the predetermined value; a second mode module including computer-readable instructions stored therein that when executed cause the one or more processors to perform the step of executing a second mode of the game responsive to the vitality number of the gaming character being less than or equal to the predetermined value; a first transmission module including computer-readable instructions stored therein that when executed cause the one or more processors to perform the step of transmitting the vitality number of the gaming character to the one or more of the plurality of gaming devices responsive to the vitality number of the gaming character being greater than the predetermined value; an updating module including computer-readable instructions stored therein that when executed cause the one or more processors to perform the step of: updating the vitality number of the gaming character responsive to receiving a damage value of the gaming character from the one or more of the plurality of gaming devices and the game being in first mode.

The non-transitory mediums can further include, for example: a second transmission module including computer-readable instructions stored therein that when executed cause the one or more processors to perform the step of transmitting a predetermined second vitality number of the gaming character to the one or more of the plurality of gaming devices responsive to the vitality number of the gaming character being less than or equal to the predetermined value; and an updating second module including computer-readable instructions stored therein that when executed cause the one or more processors to perform the step of updating predetermined second vitality number of the gaming character based upon predetermined time constraints or a number of gaming devices requesting application to the game.

Embodiments of the invention can further include, for example, computer adapted to enable multiple game users to fight a character in a virtual game, the computer comprising one or more non-transitory mediums in communication with the one or more processors, the one or more non-transitory mediums comprising: a management module including computer-readable instructions stored therein that when executed cause the one or more processors to perform the step of managing game information for a virtual game space generated in one or more of a plurality of gaming devices; a communication module including computer-readable instructions stored therein that when executed cause the one or more processors to perform the step of communicating with one or more of the plurality of gaming devices.

The non-transitory mediums can further include, for example, an accepting module including computer-readable instructions stored therein that when executed cause the one or more processors to perform the step of processing a request for current game information from the one or more of the plurality of gaming devices; a determination module including computer-readable instructions stored therein that when executed cause the one or more processors to perform the step of determining whether the game information satisfies a predetermined condition; a first mode module including computer-readable instructions stored therein that when executed cause the one or more processors to perform the step of executing a first mode of a game responsive to the game information satisfying the predetermined condition; and a second mode module including computer-readable instructions stored therein that when executed cause the one or more processors to perform the step of executing a second mode of the game responsive to the game information not satisfying the predetermined condition.

As will be appreciated by those skilled in the art, embodiments of the present invention provide a computer device, a storage medium, and a control method that implement a game that allows more users to feel satisfied with defeating an enemy character in a fight in a multiplayer game.

BRIEF DESCRIPTION OF THE DRAWINGS

Figure 1:
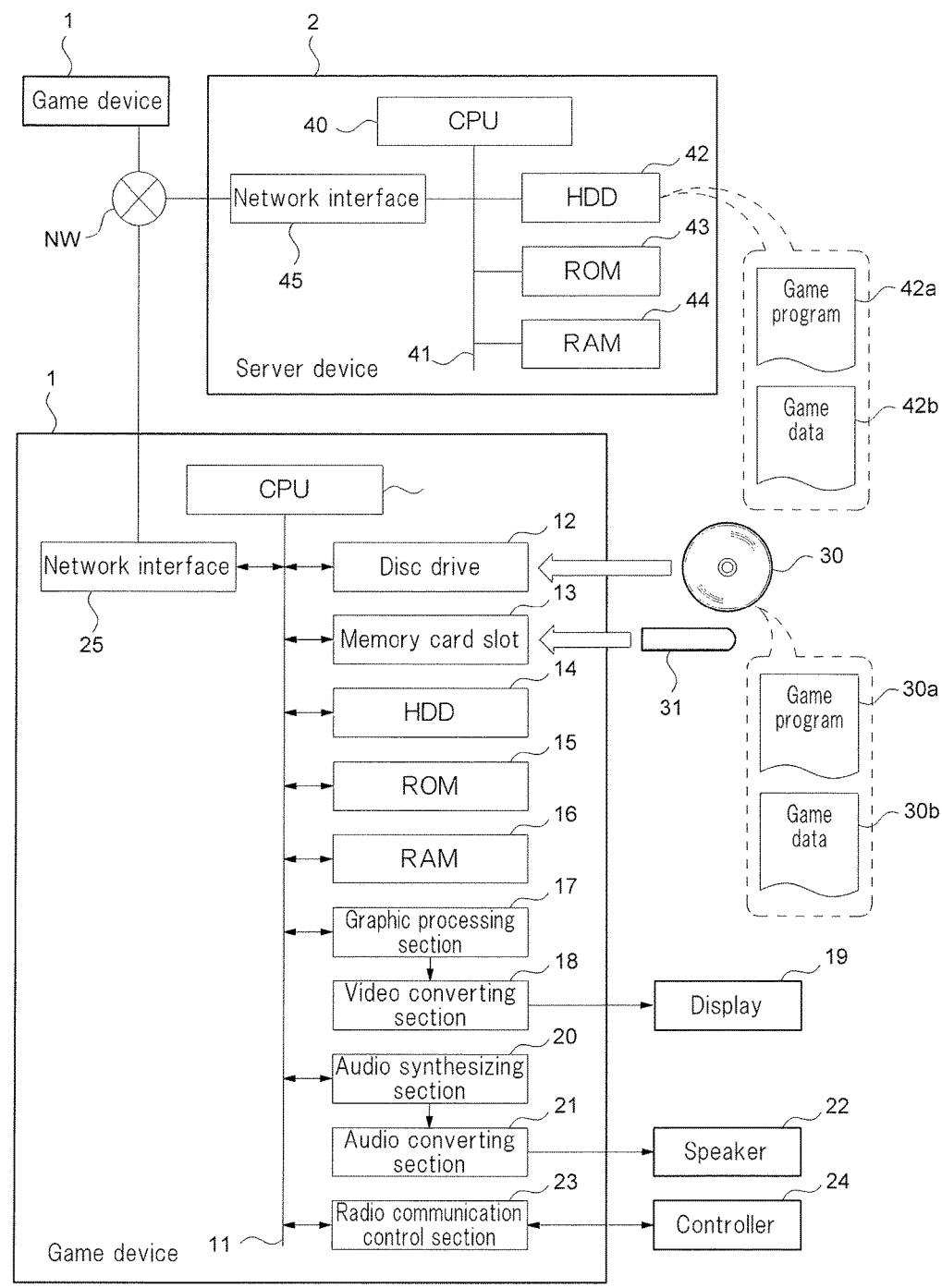
FIG. 1 is a block diagram showing the hardware configuration of a game device and the hardware configuration of a server device.

The present invention will now be described more fully hereinafter with reference to the accompanying drawings in which embodiments of the invention are shown. This invention may, however, be embodied in many different forms and should not be construed as limited to the illustrated embodiments set forth herein.

An embodiment of the invention includes a computer device comprising: a management module that stores and manages in one or more storage mediums a vitality number of an enemy character configured to act within a virtual game space generated in a game device or plural game devices; a communication module adapted to communicate with the game device; an accepting module adapted to process an application for a fight with the enemy character from the game device; a determination module adapted to determine whether or not the vitality number stored in the storage is less than or equal to a predetermined value; a first mode execution module adapted to permit the game device that has applied for the fight to play in a first mode when the vitality number stored in the storage is greater than or equal to the predetermined value; a second predetermined mode execution module adapted to permit the game device that has applied for the fight to play in a second predetermined mode when the vitality number stored in the storage is less than the predetermined value; a first transmission module adapted to transmit in the first mode the vitality number stored in the storage as the vitality of the enemy character to the game device that has applied for the fight; an updating module adapted to update in the first mode the vitality of the enemy character stored in the storage based on a damage value of the enemy character that is received from the game device; a second transmission module adapted to transmit in the second mode a predetermined vitality as the vitality of the enemy character to the game device that applied for the fight; and an updating limiting module adapted to limit updating the vitality of the enemy character stored in the storage when the game is in the second mode.

Embodiments of the invention include, for example, a server device connected to a plurality of game devices via a communication network. Damage to the enemy character can be accumulated by multiple users who have applied for a fight when the game is in the first mode. According to an embodiment of the invention, the game is in first mode responsive to the vitality of the gaming character being greater than the predetermined value. When a particular user causes damage to the enemy character in a fight, the vitality of the enemy character is subtracted by the damage value. When another user has a fight with the enemy character thereafter, this reduced vitality is reflected in the vitality of the enemy character at start of the fight. This allows multiple users to share a feeling of beating the enemy character by cooperation.

On the other hand, in the second mode, the vitality of the enemy character is less than the predetermined value and the damage caused by a particular user is not reflected in the vitality of the enemy character with which another user has a fight. When the game is in second mode, a predetermined value is given as the vitality of the enemy character to the game device that has applied for a fight. Embodiments of the invention enable more users to have a fight with the enemy character with low vitality, and multiple users to have a fight to beat the enemy character. A limit may be set in the application for a fight in the second mode. In this case, it becomes possible to prevent an excessive number of users who can experience beating the enemy character. The storage may be included in the computer device (e.g., server device), the game device, or other storage device.

Embodiments of the invention further include the transmission of information other than the vitality of the enemy character from the computer device (such as the server device) to the game device. In such situations, similar advantages can be achieved as transmitting vitality information of a game character.

Embodiments of the invention include, for example, a computer device comprising: a management module adapted to store in one or more storage mediums, game information used in a virtual game space generated in a game device or plural game devices; a communication module adapted to communicate with the game device; an accepting module adapted to process a request from the game device for delivery of current game information; a determination module adapted to determine whether or not the game information stored in the storage satisfies a predetermined condition; a first mode execution module adapted to transmit the game information to the game device that made the request for delivery of the game information when the game information satisfies the predetermined condition; and a second mode execution module adapted to transmit the game information to the game device that made the request for delivery of the game information when the game information does not satisfy the predetermined condition, updating the game information being limited in the second mode according to an embodiment of the invention.

According to an embodiment of the invention, the game information includes the vitality of an enemy character that acts within the virtual game space, and the request for delivery of current game information includes an application for a fight with the enemy character. One or more embodiments of the computer devices can further comprise, for example, an updating limiting module adapted to limit updates of the game information in the second mode. Such modules, for example, can inhibit the update of the vitality value of the character responsive to receiving a damage value of the gaming character from the gaming device.

An embodiment of the invention can further be adapted to transmit in the second mode, for example, game information to the gaming device that includes a predetermined vitality number of the enemy character.

The present application provides a storage medium and a control method in addition to the above described computer device. The specific content of the storage medium and the specific content of the control method will be described below.

Embodiments of the present invention include, for example, a storage medium which is computer-device-readable, and contains commands executed by a control section of the computer device, the commands causing the computer device (e.g., one or more processors of the computer device) to execute the steps of: storing and managing in one or more storage mediums, a vitality of an enemy character that acts within a virtual game space generated in a game device or plural game devices; communicating with the game device; processing an application for a fight with the enemy character from the game device; determining whether or not the vitality stored in the storage is a predetermined value or less; enabling the game device which has applied for a fight to play in a first predetermined mode when the vitality stored in the storage is greater than the predetermined value; enabling the game device which has applied for the fight to play in a second predetermined mode when the vitality stored in the storage is the predetermined value or less; transmitting, in the first mode the vitality stored in the storage as the vitality of the enemy character to the game device which has applied for the fight; updating, in the first mode, the vitality of the enemy character stored in the storage based on a damage value of the enemy character which is received from the game device; transmitting, in the second mode, a predetermined vitality as the vitality of the enemy character to the game device which has applied for the fight; and inhibiting, in the second mode, the update of the vitality of the enemy character stored in the storage responsive to receiving the damage value of the enemy character from the game device.

Embodiments of the invention further provided, for example, a storage medium which is computer-device-readable, and contains commands executed by a control section in the computer device, the commands causing the computer device to execute the steps of: storing and managing, in one or more storage mediums, game information used in a virtual game space generated in a game device or plural game devices; communicating with the game device; processing a request for delivery of latest game information from the game device; determining whether or not the game information stored in the storage satisfies a predetermined condition; transmitting the game information to the game device which has made the request for delivery of the game information in a first mode when the game information satisfies the predetermined condition; and transmitting the game information to the game device which has made the request for delivery of the game information in a second mode, the second mode limiting the update of the game information in storage when the game information does not satisfy the predetermined condition. The storage mediums contain commands (computer executable instructions or computer programs), and can be a semiconductor memory, an optical disc, a server device containing the commands, or other mediums as understood by those skilled in the art.

According to an embodiment of the invention, the game information is a vitality of an enemy character which acts within the virtual game space; the request for delivery of the latest game information is an application for a fight with the enemy character, the commands cause the computer device to execute the steps of limiting updating of the game information in the second mode and limiting the request for delivery of the game information in the second mode.

According to another embodiment of the present invention, the commands cause the computer device to transmit in the second mode the vitality of the enemy character which is a predetermined value or less, as the game information to be transmitted to the game device which has made the request for delivery of the game information.

Embodiments of the invention can further include a method of controlling a computer device, comprising the steps of: managing, in a storage medium, a vitality of an enemy character which acts within a virtual game space generated in a game device or plural game devices; communicating with the game device; accepting an application for a fight with the enemy character from the game device; determining whether or not the vitality stored in the storage is a predetermined value or less; permitting the game device which has applied for a fight to play in a first predetermined mode, when the vitality stored in the storage is greater than the predetermined value; permitting the game device which has applied for the fight to play in a second predetermined mode, when the vitality stored in the storage is the predetermined value or less; transmitting in the first mode the vitality stored in the storage as the vitality of the enemy character to the game device which has applied for the fight; updating in the first mode the vitality of the enemy character stored in the storage, based on a damage value of the enemy character which is received from the game device; transmitting in the second mode a predetermined vitality as the vitality of the enemy character, to the game device which has applied for the fight; and limiting in the second mode updating of the vitality of the enemy character stored in the storage, based on the damage value of the enemy character which is received from the game device.

According to an embodiment of the present invention, there is provided a method of controlling a computer device, comprising the steps of: storing in a storage game information used in a virtual game space generated in a game device or plural game devices; communicating with the game device; accepting a request for delivery of latest game information from the game device; determining whether or not the game information stored in the storage satisfies a predetermined condition; transmitting the game information to the game device which has made the request for delivery of the game information in a first mode in which updating of the game information is not limited, when the game information satisfies the predetermined condition; and transmitting the game information to the game device which has made the request for delivery of the game information, in a second mode in which updating of the game information is limited, when the game information does not satisfy the predetermined condition.

According to embodiment of the invention, the game information is a vitality of an enemy character which acts within the virtual game space; and the request for delivery of the latest game information is an application for a fight with the enemy character, the method comprising: limiting updating of the game information in the second mode; and limiting the request for delivery of the game information in the second mode.

According to an embodiment of the invention, the method of controlling the computer device comprises, for example, transmitting in the second mode, the vitality of the enemy character which is a predetermined value or less, as the game information, to the game device which has made the request for delivery of the game information.

According to an embodiment of the invention, an action game proceeds in such a manner that a player character (PC) is caused to act within a virtual game space representing a town, a forest, a plain, sea, etc., in response to the user's manipulation. In this game, various quests emerge as the game proceeds. When the quests are cleared, or some action is performed on other non-player characters (NPC) that the player character meets within the virtual game space, the game proceeds in a different way. In the game space, various enemy characters (non-player characters (NPC)) are deployed. The player character has a fight with these enemy characters as part of the game.

There are at least two kinds of enemy characters that appear in the game according an embodiment of the invention. One of the two kinds of enemy characters is the enemy character which each user must beat. For example, there are multiple independent enemy characters corresponding to the users, respectively. Damage to the enemy character caused by a particular user does not affect the vitality of the enemy character with which another user has a fight. This kind of enemy character includes, for example, many non-essential characters that appear in the game. The other kind of enemy character is an existence unique to all of the users. The other kind of enemy character is an enemy character (sometimes referred to herein as a "special enemy character") whose vitality is affected by the damages caused by a plurality of users in the fight. This enemy character has tremendous vitality set. Multiple users cooperate with each other to beat this enemy character.

Hardware Configuration

Embodiments of the invention further include hardware configurations of a game system that implements the game. FIG. 1 is a block diagram showing the hardware configuration of a game device 1 and the hardware configuration of a server device (computer device) 2, in the game system according to an embodiment of the invention. As shown in FIG. 1, the game device 1 can communicate with another game device 1 and the server device 2, via a communication network NW such as internet or Local Area Network (LAN). The game device 1 includes a Central Processing Unit (CPU) 10 adapted to controls its operation. A disc drive 12, a memory card slot 13, a Hard Disk Drive (HDD) 14 and a Read Only Memory (ROM) 15 which are a program storage means, and a Random Access Memory (RAM) 16, are connected to the CPU 10 via a bus 11.

The disc drive 12 can be loaded with a disc-type storage medium 30 such as DVD-ROM. The disc-type storage medium 30 contains a game program 30a, and game data 30b of a player character, friend characters, enemy characters, objects and textures required to generate the game space, etc., that appear in the game. The memory card slot 13 can be loaded with a card-type storage medium 31 which is able to store and save data indicating a play state such as a state in the middle of proceeding of the game, in response to a command from the CPU 10.

The HDD 14 is a high-capacity storage medium built into the game device 1. The HDD 14 is able to store the game program 30a and the game data 30b which are read-in from the disc-type storage medium 30, and save data as will be appreciated by those skilled in the art. The ROM 15, according to an embodiment of the invention, is a semiconductor memory such as a mask ROM or a Programmable Read Only Memory (PROM). The ROM 15 contains a start-up program which causes the game device 1 to start-up, a program for controlling an operation performed when the disc-type storage medium 30 is loaded, etc. The RAM 16 is composed of a Dynamic Random Access Memory (DRAM), a Static Random Access Memory (SRAM), etc. The RAM 16 reads-in the game program 30a to be executed by the CPU 10, the game data 30b required in the execution of the game program 30a, etc., from the disc-type storage medium 30 or the HDD 14, according to the play state of the game, and temporarily stores them.

The CPU 10 is further connected to a graphic processing section 17, an audio synthesizing section 20, a radio (wireless) communication control section 23, and a network interface 25 via the bus 11. The graphic processing section 17 draws a game image including the game space 100, the characters, etc., in accordance with the commands from the CPU 10, and draws messages issued by the friend characters such that the messages are superimposed on the game image. The graphic processing section 17 is connected to an outside display 19 via a video converting section 18. The video converting section 18 converts the game image drawn by the graphic processing section 17 into a motion picture format, which is displayed on the display 19.

The audio synthesizing section 20 reproduces and synthesizes a digital game sound in accordance with the command from the CPU 10. An outside speaker 22 is connected to the audio synthesizing section 20 via an audio converting section 21. Therefore, the audio converting section 21 decodes the game sound reproduced and synthesized by the audio synthesizing section 20 into an analog format and then the speaker 22 outputs the game sound in the analog format to outside.

The radio communication control section 23 has a radio communication module of 2.4 GHz band, for example, that is connected via radio (wirelessly) to a controller 24 attached on the game device 1 and is able to transmit and receive data to and from the controller 24. The user manipulates a manipulandum (not shown) such as a button attached on the controller 24 to input a signal to the game device 1, thereby controlling the action of the player character displayed on the display 19. The network interface 25 connects the game device 1 to the communication network NW such as Internet or LAN to allow the game device 1 to communicate with another game device 1 or the server device 2.

The server device 2 includes a CPU 40 which is a computer, for controlling the operation of the server device 2. A HDD 42 and a ROM 43 which are a program storage means, a RAM 44, and a network interface 45, are connected to the CPU 40, via a bus 41. The server device 2 may further include an input interface such as a keyboard, and an output interface such as a liquid crystal display, as necessary.

The HDD 42 is a high-capacity storage medium built into the server device 2. The HDD 42 contains a game program (computer program) 42a, game data 42b, etc. The ROM 43 is a semiconductor memory such as a mask ROM or a PROM. The ROM 43 contains a program for defining the basic operation of the server device 2, etc. The RAM 44 is composed of a DRAM, a SRAM, etc. The RAM 44 reads-in a game program 42a to be executed by the CPU 10, the game data 42b required in the execution of the game program 42a, etc., from the HDD 42, and temporarily stores them, as necessary. The network interface 45 is a means connected to the game device 1 via the communication network NW. The server device 2 can communicate with plural game devices 1 via the network interface 45.

Figure 2:
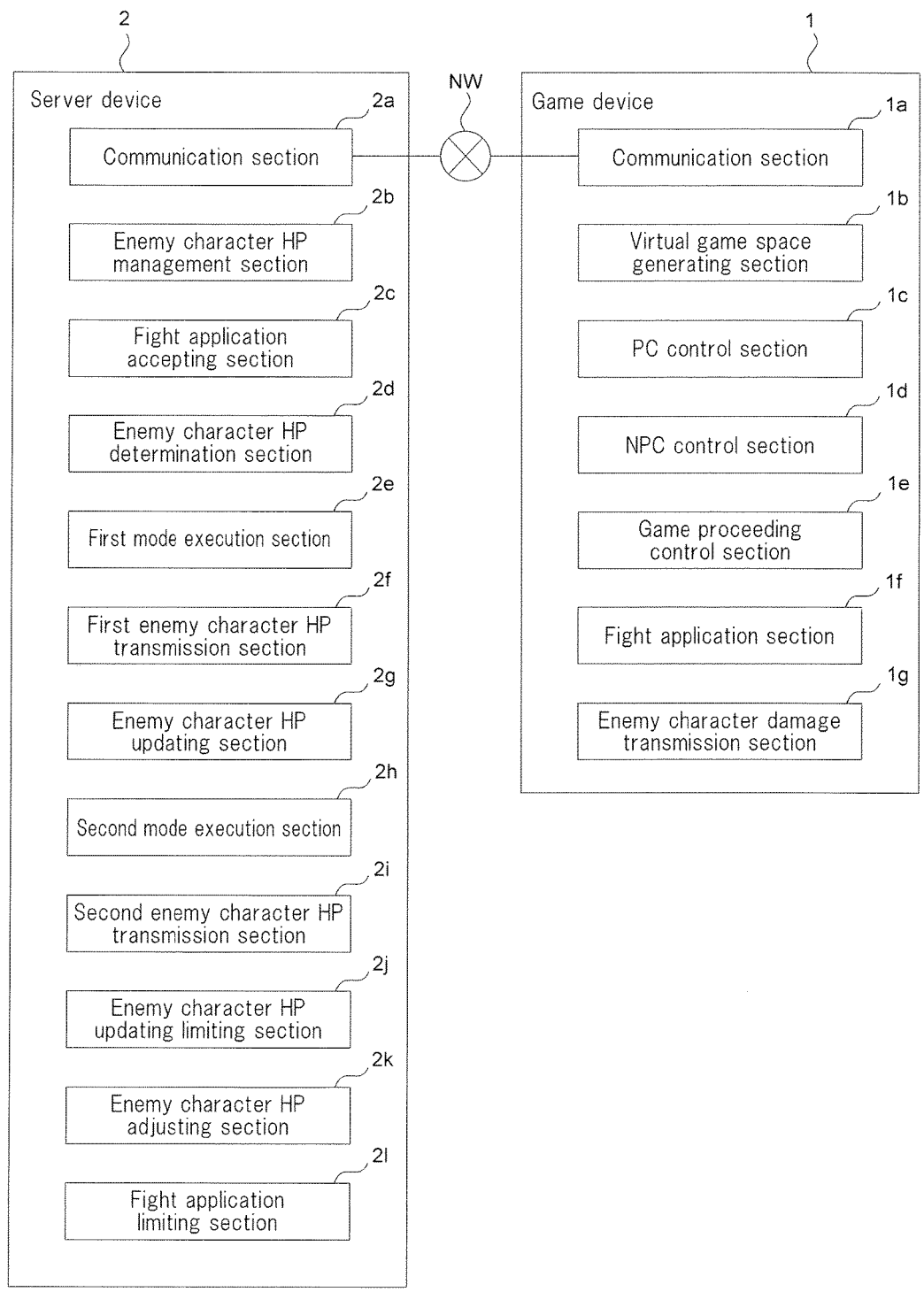
FIG. 2 is a block diagram showing the functional configuration of the game device and the functional configuration of the server device.

FIG. 2 is a block diagram showing the functional configuration of the game device 1 and the functional configuration of the server device 2 according to an embodiment of the invention. The game device 1, for example, has the functions of sections 1a to 1g described below by execution of the game program 30a. These functions are performed as hardware by, for example, the CPU 10, the HDD 14, the ROM 15, the RAM 16, the graphic processing section 17, the video converting section 18, the audio synthesizing section 20, the audio converting section 21, and the network interface 25, which are shown in FIG. 1.

The functions of the sections 1a to 1g will be described sequentially. A communication section (communication module) 1a is adapted to communicate data to and from another computer (another game device 1 and the server device 2) via the communication network. A virtual game space generating section (virtual game space generating module) 1b generates a three-dimensional game space, and further generates a two-dimensional image to display the three-dimensional game space on the display 19.

A PC control section (PC control module) 1c generates the player character and controls the action (motion) of the player character in the game space in response to the user's manipulation of the controller 24 or the state of the game. For example, the user can move the player character within the game space, provide a command to the friend character, and attack the enemy character, by manipulating the controller 24.

A NPC control section (NPC control module) 1d generates the friend characters and the enemy characters. In addition, the NPC control section 1d controls the actions of the friend characters and the actions of the enemy characters, according to the state of the game. For example, the NPC control section 1d causes the friend character to perform a specified action corresponding to the player character's action which occurs in response to the user's manipulation, or to perform an action corresponding to the state of the game and make a sound (speech) corresponding to the action. In addition, the NPC control section 1d causes the enemy character to make an attack on the player character or run away from the player character, as corresponding to the player character's action.

A game proceeding control section (game proceeding control module) 1e controls the proceeding of the game in response to the user's manipulation, with a passage of game time, etc. For example, in a case where the player character performs a specified action in response to the user's manipulation, the game proceeding control section 1e generates a specified event and reproduces a specified motion picture for a specified time. In addition, the game proceeding control section 1e changes the environment within the game space with a passage of the game time. Furthermore, the game proceeding control section 1e causes the enemy character to appear in locations of the game space depending on the locations of the player character, or causes the enemy character to make an attack on the player character when the player character gets close to the enemy character within a specified distance.

A fight application section (fight application module) 1f applies to the server device 2 for permission to have a fight with the above stated enemy character. More specifically, the fight application section 1f requests the server device 2 to deliver the latest game information indicative of the vitality or the like of the enemy character, as the application for permission to have a fight with the enemy character. In general meaning, the fight application section 1f is a game information delivery requesting section (game information requesting module) which requests the server device 2 to deliver the latest game information indicative of the vitality or the like of the enemy character.

According to an embodiment of the game, when the player character reaches a particular location within the game space (e.g., last dungeon, etc., set so that the player character can reach it in a final phase of the proceeding of the game), the player character can have a fight with the enemy character. Specifically, when the player character reaches this location, the fight application section 1f causes the communication section 1a to transmit an application for a fight, (which can include a request for delivery of latest game information) to the server device 2. In response to this, the server device 2 transmits the information indicative of the vitality of the enemy character at the time the request is received by the server device.

Responsive to receiving this information, the game device 1 causes the enemy character having vitality to appear in the game space. Now, the user can have a fight with this enemy character by manipulating the player character. Data required to display the enemy character on the display 19 of the game device 1, and data required to cause the enemy character to act are stored in, for example, the game data 30b which is read-in by the disc drive 12 of the game device 1, except for the vitality.

An enemy damage transmission section (enemy damage transmission module) 1g is a game information transmission section (game information transmission module). The enemy damage transmission section 1g transmits to the server device 2 a damage value (game information) given to the enemy character, via the communication section 1a. The process for transmitting the damage value is executed automatically or by the user's specified manipulation, after the fight with the enemy character is finished. According to an embodiment of the game, a temporal limit is for the fight with the enemy character. For example, according to an embodiment of the game, when 8 minutes passes after the start of the fight, the enemy character moves away from the corresponding location. The time for which the player character can continue to have a fight with the enemy character may be suitably changed. For example, the server device 2 can transmit the information indicative of the changed time for which the player character can continue to have a fight with the enemy character, when the server device 2 transmits the latest vitality of the enemy character to the game device 1. Receiving this information, the game device 1 manages the time for which the game device 1 continues to have a fight with the enemy character, based on the received information.

The server device 2 has functions of sections 2a to 2l as described below by execution of the game program 42a. These functions are performed as hardware by, for example, the CPU 40, the HDD 42, the ROM 43, the RAM 44, and the network interface 45, which are shown in FIG. 1.

The functions of sections 2a to 2l will be described sequentially. A communication section (communication module) 2a communicates data to and from one or more of the plurality of game devices 1 via the communication network. An enemy vitality management section (enemy hit points (HP) management module) 2b is a game information management section (game information management module). The enemy vitality management section 2b stores in the HDD 42 as a storage section the vitality of the enemy character (which is unique to all of the users), or appropriately updates the vitality. A fight application accepting section (fight application accepting module) 2c is a delivery request accepting section (delivery request accepting module). The fight application accepting section 2c accepts the application for the fight (request for delivery of the game information) transmitted from the game device 1. Then, an enemy vitality determination section 2d is activated to determine whether the server device 2 should be operated in a first mode or in a second mode as will be described later.

The enemy vitality determination section (enemy vitality determination module) 2d is a game information determination section (game information determination module). The enemy vitality determination section 2d obtains the vitality (game information) of the enemy character at a present moment, from the enemy vitality management section 2b, and determines whether or not the obtained information satisfies a predetermined condition. According to an embodiment of the game, the enemy vitality determination section 2d determines whether or not the obtained vitality is greater than a predetermined value (sometimes referred to herein as "mode determination value"). According to an example embodiment, the initial vitality of the enemy character is set to, for example, 1,000,000, and the mode determination value is set to, for example, 5,000.

A first mode execution section (first mode execution module) 2e operates the server device 2 in a first mode in which updating of the game information is not limited, when the game information satisfies a predetermined condition. Specifically, when the enemy vitality determination section 2d determines that the current vitality is greater than the mode determination value (e.g., 5,000), the first mode execution section 2e limits the mode of the operation of the server device 2 to the first mode. The server device 2 that operates in the first mode functions as a first enemy vitality transmission section 2f and an enemy vitality updating section 2g. The first enemy vitality transmission section (first enemy vitality transmission module) 2f is a first game information delivering section (first game information delivering module), and the enemy vitality updating section (enemy vitality updating section) 2g is a game information updating section (game information updating module).

According to an embodiment of the invention, the first enemy vitality transmission section 2f transmits the vitality stored in the HDD 42 as the vitality of the enemy character at the present moment (e.g., at the time the application is received from the gaming device 1 that has applied for the fight). The enemy vitality updating section 2g updates the vitality (game information) of the enemy character at a present moment based on a damage value given to the enemy character when the damage value is transmitted from the game device 1.

A second mode execution section (second mode execution module) 2h operates the server device 2 in a second mode in which updating of the game information is limited. The second mode is operated when, for example, the game information (in the example embodiment, the vitality of the enemy character) does not satisfy the predetermined condition. More specifically, when the enemy vitality determination section 2d determines that the vitality at a present moment is equal to or less than the mode determination value (e.g., 5000), the second mode execution section 2h limits the mode of the operation of the server device 2 to the second mode. The server device 2 that operates in the second mode can include, for example: a second enemy vitality transmission section 2i, an enemy vitality updating limiting section 2j, an enemy vitality adjusting section 2k, and a fight application limiting section 2l. The second enemy vitality transmission section (second enemy vitality transmission module) 2i is a second game information delivering section (second game information delivering module). The enemy vitality updating limiting section (enemy vitality updating limiting module) 2j is a game information updating limiting section (game information updating limiting module). The enemy vitality adjusting section (enemy vitality adjusting section) 2k is a game information adjusting section (game information adjusting module). The fight application limiting section (fight application limiting module) 2l is a game information delivery request limiting section (game information delivery request limiting module).

Specifically, the second enemy vitality transmission section 2i transmits the vitality, which is equal to or less than the predetermined value, to the game device 1 that has applied for the fight or requested delivery of the latest game information. The enemy vitality updating limiting section 2j limits (e.g., inhibits) updating the vitality based on the damage value given to the enemy character when the damage value is transmitted from the game device 1. The enemy vitality adjusting section 2k adjusts the vitality to be transmitted to the game device 1 which has newly applied for the fight, based on the number of applications for the fight from the time point when the second mode is enabled, and/or time that passes from this time point. Therefore, "predetermined vitality" which is transmitted from the second enemy vitality transmission section 2i to the game device 1 is the vitality having been adjusted by the enemy vitality adjusting section 2k.

The fight application limiting section 2l limits the application for the fight (including a request for delivery of game information) from the game device 1, and permits the fight application accepting section 2c to accept the application or inhibit the fight application accepting section 2c from accepting the application based on a predetermined condition. For example, the fight application limiting section 2l sets an upper limit value in the number of applications for the fight from the time point when the second mode is enabled, and when the number of applications for the fight reaches this upper limit value, the fight application limiting section 2l does not accept the application for the fight any more. Or, the fight application limiting section 2l sets a period for which the server device 2 accepts the applications for the fight in the second mode, and when this period passes, the fight application limiting section 2l does not accept the application for the fight any further.

Figure 3:
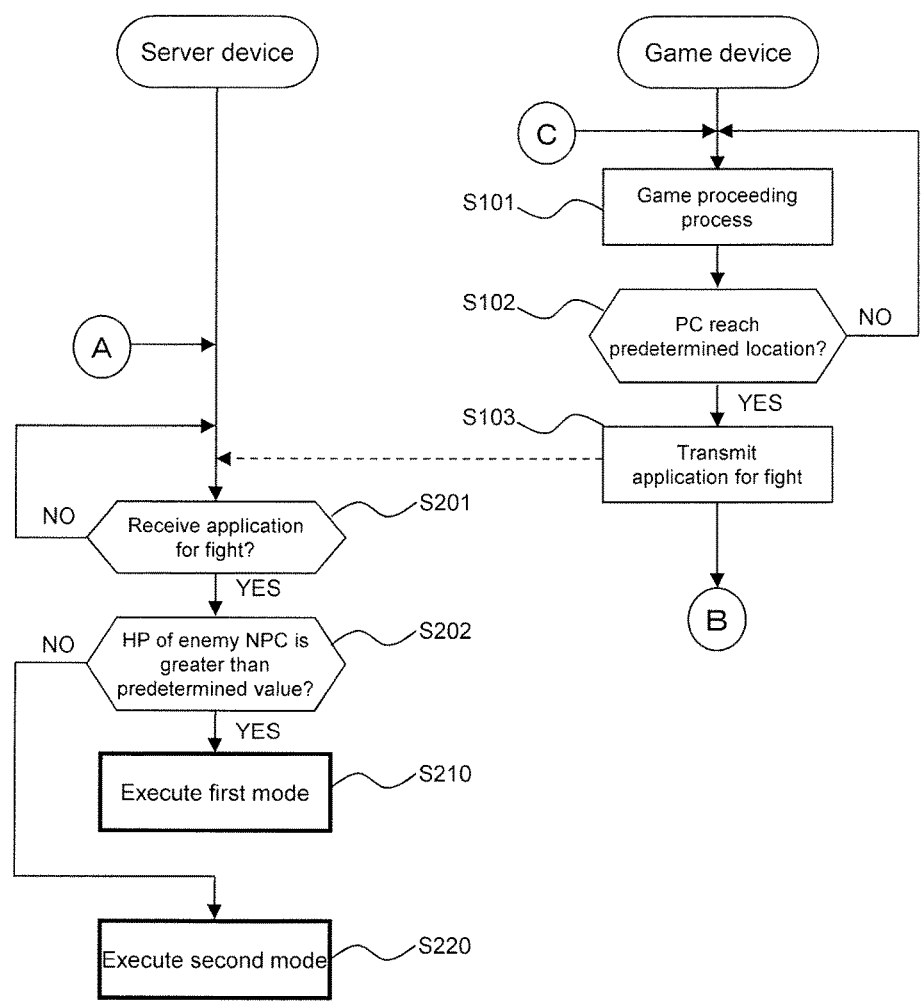
FIG. 3 is a flowchart showing a mode determination process performed by the server device.

Next, the mode determination process initially performed by the server device 2 in a case where the game device 1 applies for a fight to the server device 2, will be described. As shown in FIG. 3, the game proceeding control section 1*e* of the game device 1 performs a game proceeding process in response to the user's manipulation of the player character, or the like (step S101). The game device 1 determines whether or not the player character has reached a specified location within the game space, where the application for the fight is made (step S102). According to an embodiment of the game, for example, the last dungeon which the player character can reach in a final phase of the proceeding of the game is set as a specified location. When the player character enters the last dungeon, the game device 1 determines that the player character has reached the specified location (step S102: YES). On the other hand, when the game device 1 determines that the player character has not reach the specified location yet (step S102: NO), it continues the game proceeding process of step S101.

When the game device 1 determines that the player character has reached the specified location in step S102, it transmits the application for the fight to the server device 2 (step S103). This process is performed by the communication section 1*a* and the fight application section 1*f*.

According to certain embodiments, the process can further including determining whether or not the game device 1 is connected to the communication line after step S102 and before step S103. When a result of the determination is "YES," the game device 1 moves to step S103. On the other hand, when a result of the determination is "NO," the game device 1 does not perform step S103 and instead performs a process for causing the player character to have a fight with the enemy character (i.e., enemy character managed locally) managed by the game device 1.

Receiving the application for the fight (step S201: YES), the server device 2 determines the mode (step S202). In this mode determination, the server device 2 determines whether or not the vitality of the enemy character (e.g., the "enemy NPC" in FIG. 2) is greater than the predetermined value. For example, the server device 2 compares the vitality of the enemy character at a present moment, which is managed by the enemy vitality management section 2*b*, to the predetermined value (e.g., 5,000). When the server device 2 determines that the managed vitality is greater than the predetermined value (step S202: YES), it executes the first mode (step S210). On the other hand, when the server device 2 determines that the managed vitality is equal to or less than the predetermined value (step S202: NO), it executes the second mode (step S220).

Figure 4:
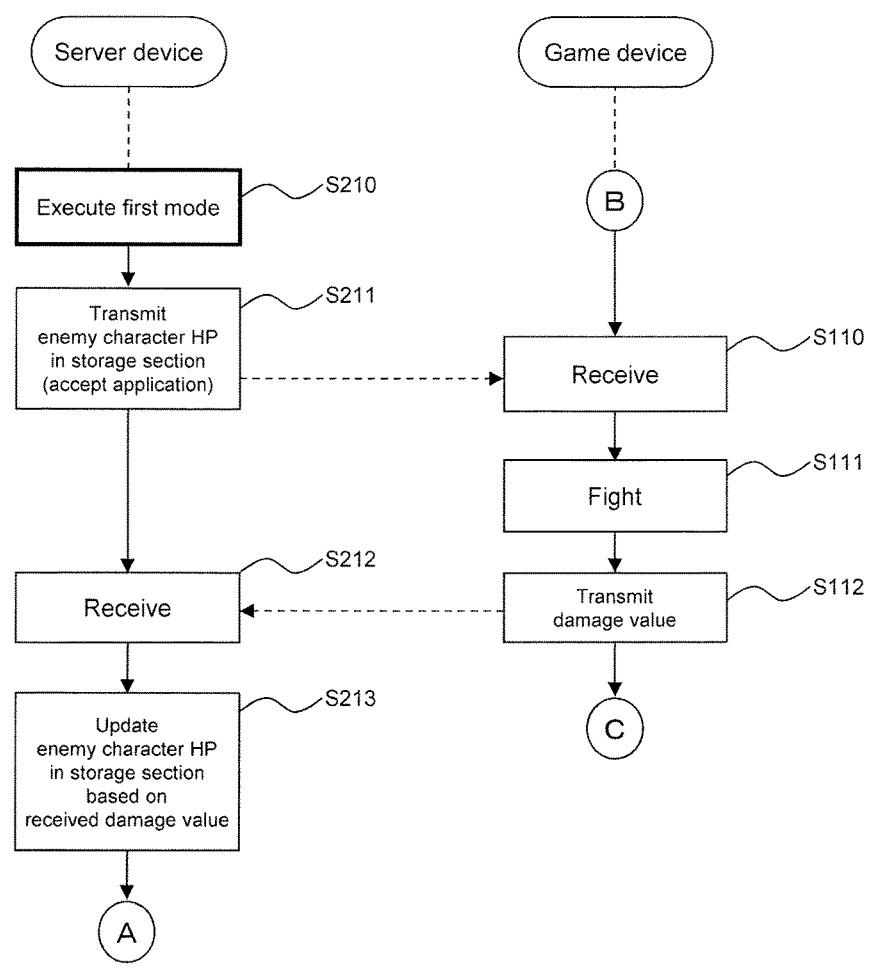
FIG. 4 is a flowchart showing the operation of the server device in a first mode.

FIG. 4 is a flowchart showing the operation of the server device 2 in the first mode. When the server device 2 operates in the first mode (step S210), it transmits the information indicative of the enemy vitality in the storage section, to the game device 1 which has applied for the fight in step S103 (step S211). Specifically, the first enemy vitality transmission section 2*f* obtains the information indicative of the enemy vitality stored in the HDD 42, or the like, by the enemy vitality management section 2*b*, and transmits this information to the game device 1 via the communication section 2*a*. Thus, the server device 2 accepts the application for the fight (including, for example, a request for delivery of the game information) from the game device 1.

Responsive to receiving the information indicative of the vitality of the enemy character at a present moment from the server device 2 (step S110), the game device 1 causes the player character and the enemy character to have a fight with each other in response to the user's manipulation (step S111). The NPC control section 1*d* of the game device 1 causes the enemy character to appear within the game space generated by the virtual game space generating section 1*b*, the enemy character having as one status the vitality received in step S110. The PC control section 1*c*, the NPC control section 1*d*, and the game proceeding control section 1*e* execute the fight between the player character and the enemy character in response to the user's manipulation. The NPC control section 1*d* stores the damage value given to the enemy character. As described above, according to an embodiment of the game, the limit is set in the time for which one fight between the player character and the enemy character continue to take place. For example, when 8 minutes passes, the present fight is forcibly terminated. When the fight with the enemy character is terminated, the enemy damage transmission section 1*g* transmits the information (game information) indicative of the damage value given to the enemy character in the present fight, from the game device 1 to the server device 2 (step S112).

Receiving the information indicative of the damage value via the communication section 2*a* (step S212), the enemy vitality management section 2*b* updates the vitality of the enemy character stored in the HDD 42, or the like (step S213). According to an embodiment, the enemy vitality management section 2*b* subtracts the value corresponding to the received damage value from the stored vitality, and stores the resulting value in the storage section such as the HDD 42 or the like. Note that the value to be subtracted from the vitality may be the damage value or the associated value. Thereafter, the server device 2 returns to step S201 (see FIG. 3) again. Then, when the server device 2 receives the application for the fight from the game device 1, the server device 2 performs the mode determination (step S202) and the following steps.

According to an embodiment of the game, particular vitality common to the whole body is set in the enemy character. This common particular vitality is reduced when any part of the body is damaged. Alternatively, the body may be divided into plural body parts (e.g., 30 parts), the initial value of the vitality corresponding to each body part may be set, and the vitality may be updated according to the damage value given to each body part. For example, it is assumed that the initial vitality of a head is set to 50,000, and the initial vitality of a left arm is set to 30,000. If the head experiences the damage of a value of 4,000 and the left arm experiences the damage of a value of 1,000, the vitality of the head is updated into 46,000 and the vitality of the left arm is updated into 29,000. When the vitality of a particular body part reaches zero, only that body part is destroyed (destroyed part). When the vitality of all body parts of the body reaches zero, the game device 1 can succeed in beating the enemy character.

In a case where the initial vitality is set for each body part, the server device 2 manages the vitality for each body part. The information indicative of the vitality transmitted from the server device 2 to the game device 1 in step S211 is associated with each body part of the enemy character. By comparison, the game device 1 stores the damage value given to the enemy character, for each body part. In the transmission process of the damage value in step S112, the game device 1 creates information associating the given damage value and the corresponding body part, and transmits this information to the server device 2. The server device 2 updates the vitality corresponding to each body part, based on the received damage value corresponding to each body part.

As described above, the server device 2 which operates in the first mode sequentially updates the vitality of the enemy character managed in the server device 2, every time the server device 2 receives the damage value given to the enemy character from the game device 1. The user who has applied for the fight can have a fight with the enemy character having the updated latest vitality. Since plural users have a fight with the enemy character, the vitality of the enemy character can be reduced gradually. This enables, for example, multiple users to share the satisfaction of beating the enemy character by cooperation.

Figure 5:
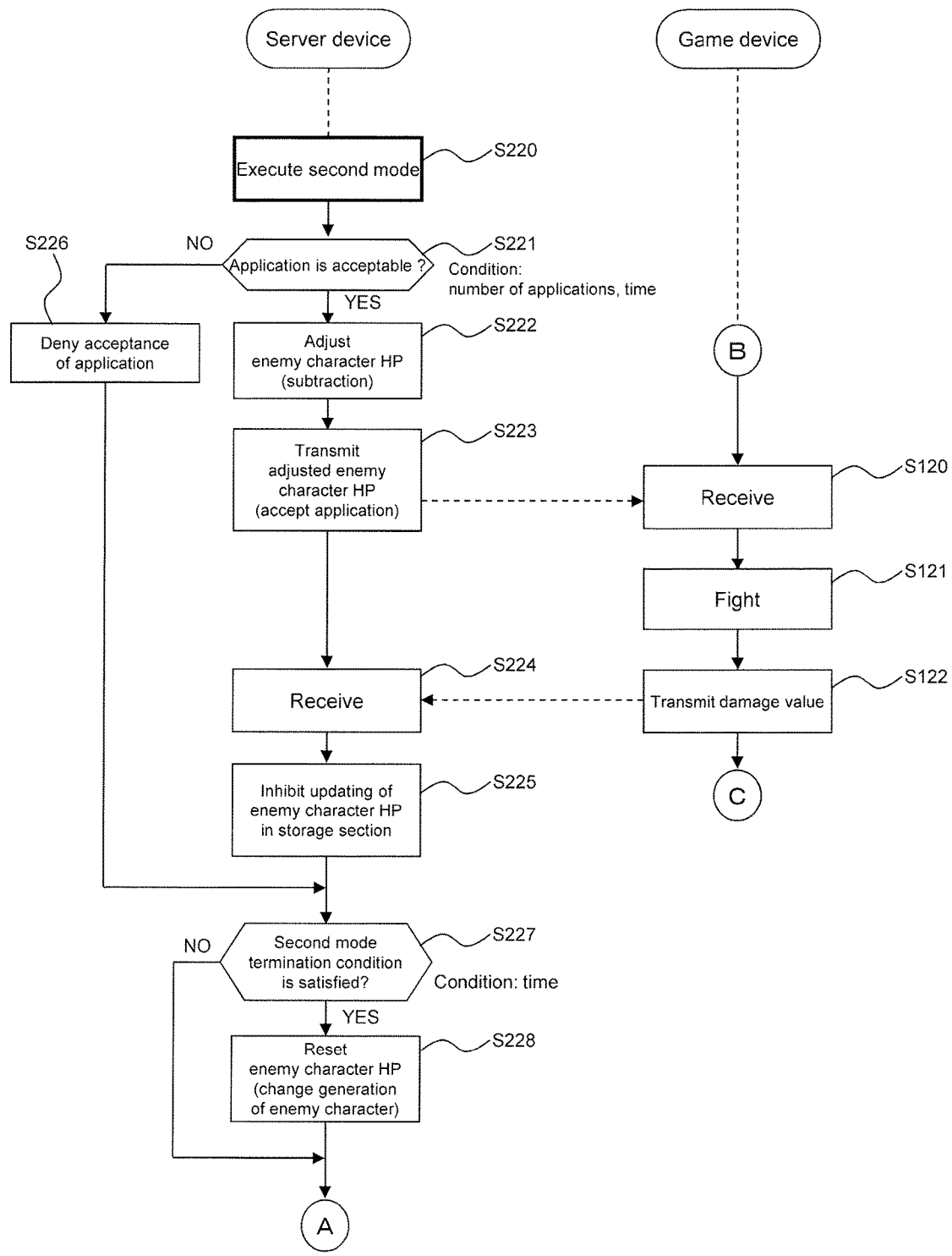
FIG. 5 is a flowchart showing the operation of the server device in a second mode.

FIG. 5 is a flowchart showing the operation of the server device 2 in the second mode. When the server device 2 operates in the second mode (step S220), it determines whether or not the application for the fight received in step S201 is acceptable (step S221). According to an embodiment of the game, a limit is set in the period for which the application for the fight is acceptable in the second mode. This prevents, for example, a situation in which the users who can have a fight with the enemy character in the second mode increase to excess, and to mitigate the overloaded state of the server device 2 which is caused by an increase in the access to the server device 2. Specifically, when the number of applications for the fight reaches a predetermined number, or a predetermined period passes after acceptance of the application starts, the server device 2 will not accept the application any more. The content of limit is not limited to this. For example, when the number of applications for the fight reaches a predetermined number and the period that passes after acceptance of the applications reaches a predetermined period, the server device 2 may not accept further applications. Or, another limit (e.g., condition in which a user owns a specified item to be used in the game), etc., may be set or added.

When the server device 2 determines that the application for the fight is acceptable (step S221: YES), it adjusts the vitality of the enemy character (step S222), and transmits to the game device 1 the information indicative of the adjusted vitality as the vitality of the enemy character at a present moment (step S223). More specifically, the enemy vitality adjusting section 2k gradually reduces the vitality of the enemy character which is to be transmitted to the game device 1, as the number of the applications for the fight in the second mode increases, or according to the time that passes after acceptance of the application for the fight in the second mode starts.

According to an embodiment of the game, upon the start of the second mode, the vitality of the enemy character is reset to a preset predetermined value (e.g., 5,000). In the adjustment process of the vitality (step S222), the vitality of the enemy character is reduced according to the number of applications and/or the time that passes after acceptance of the application, using the predetermined value as a reference value. The reference value is not limited to the preset predetermined value. For example, the vitality at a time point when the vitality becomes equal to or less than the mode determination value (e.g., 5,000) for the first time (i.e., the vitality that is not reset), may be used as the predetermined value.

The adjusting method of the vitality is not limited to the above. For example, the vitality may be adjusted based on both the increase in the number of applications for the fight and the time that passes after acceptance of the application, or other criterion. Or, in the second mode, the vitality may be adjusted using the vitality finally updated in the first mode, as a reference value. Or, in addition to the vitality updated in the first mode, the vitality to be transmitted to the game device 1 in the second mode may be pre-stored in the HDD 42 or the like, and may be transmitted to the game device 1 in the second mode. It is not necessary to reduce the vitality in every execution of step S222. Instead, the vitality may be reduced in a stepwise manner based on the number of applications for the fight and the time that passes after acceptance of the application starts. Specifically, in step S222, the vitality may be reduced only when the number of applications for the fight or the time that passes after acceptance of the application starts satisfies a predetermined condition. Furthermore, without reducing the vitality, constant vitality (e.g., 5,000) may be transmitted to the game device 1. In this case, step S222 of FIG. 5 may be omitted.

Receiving the vitality of the enemy character at a present moment, from the server device 2 (step S120), the game device 1 performs the process similar to step S111 and step S112 in the first mode. Specifically, the game device 1 causes the player character and the enemy character to have a fight with each other, in response to the user's manipulation (step S121). When the fight with the enemy character is finished, the enemy damage transmission section 1g transmits the information indicative of the damage value given to the enemy character in this fight, from the game device 1 to the server device 2 (step S122).

At this time, as in the first mode, the server device 2 receives information indicative of the damage value from the game device 1 (step S224). However, in the second mode of the present embodiment, the server device 2 does not update the vitality based on the received damage value (step S225). In other words, in the second mode, the damage to the enemy character which is caused by each user in the fight with the enemy character is not reflected in the vitality managed by the enemy vitality management section 2b. Therefore, the user who has applied for the fight has a fight with the enemy character having the vitality adjusted in step S222, irrespective of how much another user has caused damage to the enemy character in the second mode, or whether or not another user has beaten the enemy character in the second mode.

Alternatively, the vitality managed in the second mode may be updated in a range of 0<vitality≤predetermined value (e.g., 5,000). In this case, a lower limit value can be set in the vitality. When the updated vitality reaches the lower limit value, the server device 2 may deliver the lower limit value (e.g., 1,000) of the vitality to the game device 1 thereafter. When the server device 2 updates the vitality based on the damage value received from the game device 1 in the first mode, the vitality may become zero. In this case, the server device 2 may update the vitality such that the vitality is returned to the predetermined value (e.g., 5,000), and transmit the updated vitality to the game device 1. Or, the game device 1 may be configured to transmit to the server device 2, a specified rate of the damage value given to the enemy character. Or, the game device 1 may be configured to transmit to the server device 2 only a value obtained by subtracting the predetermined value from the given damage value.

Or, the server device 2 may be configured not to receive the information indicative of the damage value from the game device 1 in the second mode. The game device 1 may be configured not to transmit such information. The game device 1 may be configured to transmit the damage value given in the fight to the server device 2 only when the user has succeeded in beating the enemy character. Or, in a case where the user succeeds in beating the enemy character, the game device 1 may be configured not to transmit the damage value but transmit only the information indicative of success of beating to the server device 2.

Turning back to the flowchart of FIG. 5, after step S225, the server device 2 determines whether or not a termination condition of the second mode is satisfied (step S227). According to an embodiment of the game, when a predetermined period (e.g., 8 h) passes after acceptance of the application for the fight starts, the server device 2 determines that the termination condition of the second mode is satisfied. The termination condition is not limited to this. For example, at a time point when the number of users who have succeeded in beating the enemy character in the second mode reaches a predetermined value, the server device 2 may determine that the termination condition of the second mode is satisfied. In this case, the game device 1 transmits the damage value to the server device 2 in step S122, along with the information indicative of whether or not the enemy character has been successful beaten. The server device 2 may count the number of times there is information indicative of success. In a case where the vitality is constant during the second mode, the server device 2 may count the number of times the damage value received in step S224 was equal to or greater than the vitality transmitted in step S223.

The server device 2 determines whether or not the termination condition of the second mode is satisfied as described above. When the server device 2 determines that the termination condition of the second mode is not satisfied (step S227: NO), it returns to step S201 (see FIG. 3), and waits for receiving the application for the fight, from the game device 1. In this case, the vitality of the enemy character is still managed to be equal to or less than the predetermined value (e.g., 5,000). Therefore, when the game device 1 applies for the fight (step S201: YES), the server device 2 performs step S221 and the following steps (see FIG. 5) in the second mode (step S202: NO, step S220).

On the other hand, when the server device 2 determines that the termination condition of the second mode is satisfied (step S227: YES), it resets the vitality of the enemy character (step S228), returns to step S201 (see FIG. 3), and waits for receiving the application for the fight from the game device 1. By the reset in step S228, the vitality of the enemy character is returned to the initial value. When the game device 1 applies for the fight (step S201: YES), the server device 2 performs step S211 and the following steps (see FIG. 4) in the first mode (step S202: YES, step S210). When the server device 2 determines that the application for the fight is unacceptable (step S221: NO), it transmits information indicating that the application for the fight is unacceptable, to the game device 1 which has applied for the fight (step S226), and then performs step S227 and the following steps.

The reset of the vitality of the enemy character (step S228) means the change of generation of the enemy character which the user has a fight. When the termination condition of the second mode is satisfied, the vitality of the enemy character may be reset to a different value instead of resetting it to the initial value. Or, instead of resetting the vitality of the enemy character, the present enemy character may be changed into another (new) enemy character. Or, when the server device 2 determines that the application for the fight is unacceptable in step S221, it may transmit information indicative of vitality of enemy character in next generation, in addition to information indicating that the application for the fight is unacceptable, to the game device 1 which has applied for the fight (step S226).

Figure 6:
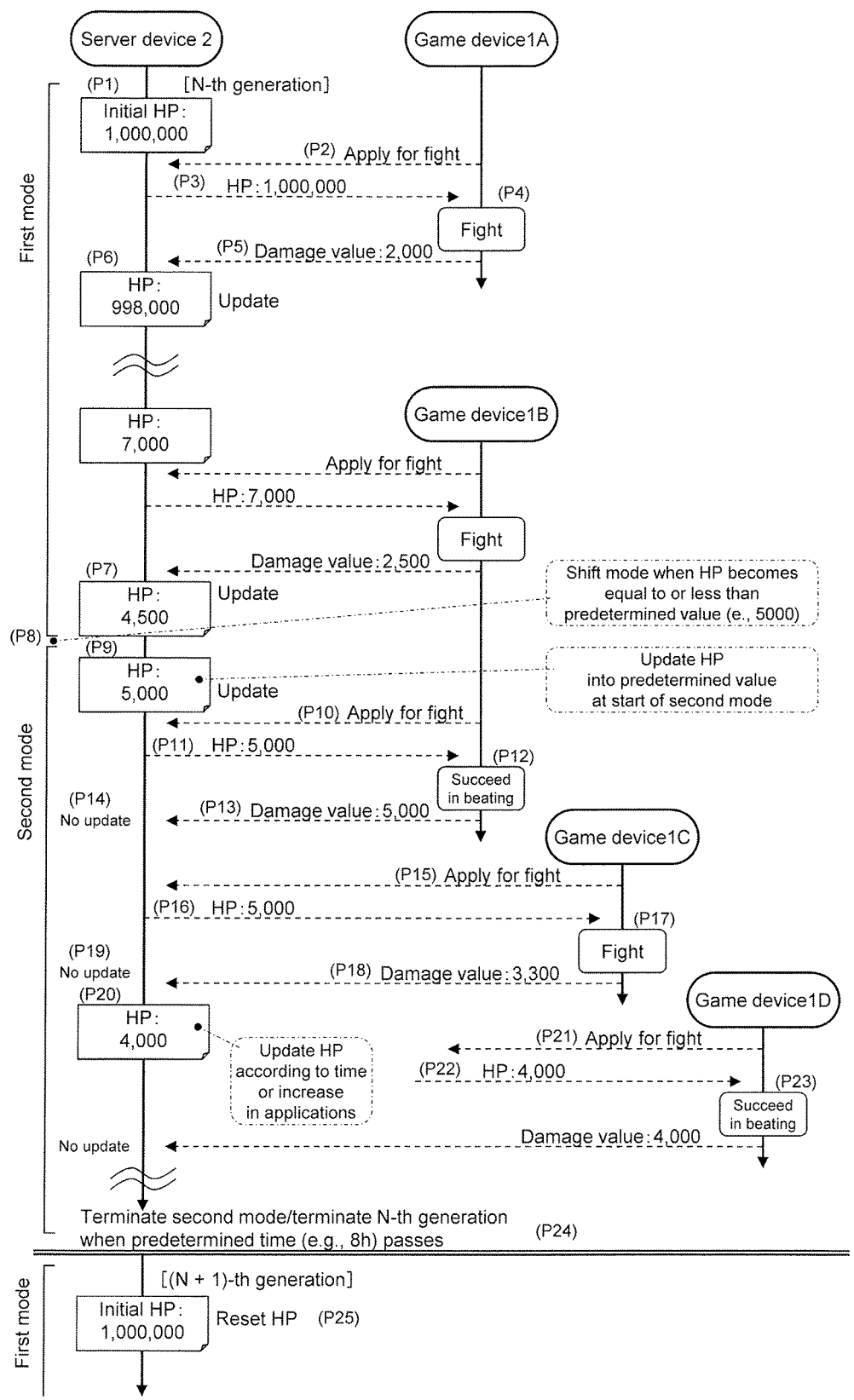
FIG. 6 is a schematic view showing the exemplary operation of the game device and the exemplary operation of the server device.

FIG. 6 is a schematic view showing the exemplary operation of the game device 1 and the exemplary operation of the server device 2. FIG. 6 shows an example, in which enemy character in N-th generation appears, the first and second modes proceed, and the enemy character in N-th generation changes into enemy character in (N+1)-th generation. The reference symbols P1, P2 and the like in description below correspond to the reference symbols P1, P2 and the like in parenthesis expressed to distinguish the processes of FIG. 6, respectively.

The initial vitality of the enemy character in N-th generation is set to 1,000,000 (P1, step S228 of FIG. 5). When a game device 1A applies for the fight (P2, step S201 of FIG. 3: YES), the server device 2 operates in the first mode and transmits the initial value 1,000,000 as the vitality at a present moment (P3, step S211 of FIG. 4). Receiving this vitality, the game device 1A causes the player character and the enemy character to have a fight with each other, in response to the user's manipulation (P4, step S111 of FIG. 4). After the fight is finished, the game device 1A transmits the damage value 2,000 given to the enemy character, to the server device 2 (P5, step S112 of FIG. 4). Based on the received damage value 2,000, the server device 2 updates the vitality of the enemy character to 998,000 (P6, step S213 of FIG. 4).

According to an embodiment of the game, the above described operation is repeated until the vitality of the enemy character becomes equal to or less than the predetermined value (e.g., 5,000). In particular, the server device 2 transmits the updated vitality and updates the vitality based on the damage value, which take place sequentially. When the vitality updated based on the damage value transmitted from a particular game device 1 becomes equal to or less than the predetermined value 5,000 (P7, step S202 of FIG. 3: NO), the server device 2 shifts from the first mode to the second mode (P8, step S220 of FIG. 3). According to an embodiment of the game, when the server device 2 shifts from the first mode to the second mode, the vitality of the enemy character is forcibly reset to the predetermined value (e.g., 5,000) (P9).

The server device 2 which operates in the second mode transmits the predetermined vitality when it accepts the application for the fight (P10, P15) from a game device 1B, 1C, or the like (P11, P16, step S223 of FIG. 5). In the second mode, even when the server device 2 receives the damage value from the game device 1B, 1C, or the like (P13, P18, step S224 of FIG. 5), it does not update the vitality of the enemy character based on the received damage value (P14, P19, step S225 of FIG. 5). Instead, the server device 2 suitably adjusts the vitality according to the number of applications or the time that passes after acceptance of the application starts in the second mode (P20, step S222 of FIG. 5). After that, a game device 1D applies for the fight (P21), and the server device 2 accepts this application and transmits the adjusted vitality (e.g., 4,000) to the game device 1D as the vitality of the enemy character at a present moment (P22, step S223 of FIG. 5).

In the above described manner, the server device 2 continues to operate in the second mode. When the predetermined time (e.g., 8 hours) passes after acceptance of the application starts, and the termination condition of the second mode is satisfied (P24, step S227 of FIG. 5: YES), change of generation from the enemy character in N-th generation to the enemy character in (N+1)-th generation takes place. For example, when the vitality of the enemy character is reset to the initial value 1,000,000 (P25, step S228 of FIG. 5), the enemy character in (N+1)-th generation after the reset appears.

As indicated by the game device 1B of FIG. 6, the game device 1 which gained permission to apply for the fight from the server device 2 operating in the first mode and made a fight, may apply for a fight to the server device 2 operating in the second mode, as a matter of course. In this case, also, so long as the number of applications or the time that passes after acceptance of the application starts, etc., satisfies the condition under which the application is acceptable (step S221 of FIG. 5), the application for the fight is accepted. Although not shown in FIG. 6, the same game device 1 can have a fight with the enemy character in the same generation multiple times in the second mode. Specifically, the following procedure may occur. The game device 1 gains permission to apply for the fight from the server device 2 operating in the second mode, has a fight with the enemy character, applies for the fight again to the server device 2 operating still in the second mode after the fight is finished, and has a fight with the enemy character in the same generation.

With the above described configuration, according to one or more embodiments, multiple users can share a feeling of beating the enemy character having high vitality by cooperation. In addition, the user who can beat the enemy character in one generation is not limited to one user, but multiple users can beat the enemy character in one generation (P12, P23). As should be understood from the above, according to an embodiment of the game, a chance that the user can beat the enemy character can be increased, although relatively many users can participate in the fight with the enemy character. This motivates the users to participate in the game to beat the strong enemy character.

Although the enemy character is the unique existence as described above, the present invention is not limited to this. For example, plural (or plural kinds of) enemy characters are prepared, and the user can choose one or plural enemy character(s) from these enemy characters. In this case, when the server device 2 gives a permission to apply for the fight, the game device 1 executes a fight with the one or plural enemy character(s) chosen by the user. Although in the present embodiment, the server device 2 manages the vitality of the enemy character (S213, etc.) and transmits the vitality of the enemy character (S211, S223, etc.), the present invention is not limited to this. The vitality of the enemy character at a certain moment is equal to the vitality obtained by subtracting the damage value integrated until that moment, from a set maximum vitality. Therefore, the server device 2 may manage and transmit the maximum vitality set in the enemy character and the damage value. In a case where the game device 1 knows the maximum vitality of the enemy character, the server device 2 may transmit only the integrated damage value to the game device 1.

As will be understood with reference to the paragraphs above and the referenced drawings, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in non-transitory storage mediums other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such computer-readable storage media with regard to embodiments of computer-implemented methods described. Likewise, any reference to the following computer-implemented methods with respect to systems and computer-readable storage media is provided for explanatory purposes, and is not intended to limit any of such computer-implemented methods described.

As used throughout this application, the words "may" or "can" are used in a permissive sense (i.e., meaning having the potential to), rather than the mandatory sense (i.e., meaning must). The words "include", "including", and "includes" mean including, but not limited to. As used throughout this application, the singular forms of articles, such as "a", "an" and "the," include plural referents unless the content clearly indicates otherwise. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic, optical, or magnetic quantities within memories, registers, or other information storage devices, transmission devices, or display devices of the special purpose computer or similar special purpose electronic processing/computing device.

In the drawings and specification, there have been disclosed embodiments of the embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

The invention claimed is:

1. A computer adapted to enable multiple gamer users to fight a gaming character in a virtual game, the computer comprising:
one or more processors;
one or more input and output units in communication with the one or more processors and positioned to receive communications; and
one or more non-transitory mediums in communication with the one or more processors, the one or more non-transitory mediums comprising:
a management module including computer-readable instructions stored therein that when executed cause the one or more processors to:
manage a vitality number of the gaming character adapted to act within a virtual game space generated in one or more of a plurality of gaming devices;
a communication module including computer-readable instructions stored therein that when executed cause the one or more processors to:
communicate with one or more of the plurality of gaming devices;

an accepting module including computer-readable instructions stored therein that when executed cause the one or more processors to:
  process an application to fight the gaming character from one or more of the plurality of gaming devices;
a determination module including computer-readable instructions stored therein that when executed cause the one or more processors to:
  determine whether the vitality number of the gaming character is greater than a predetermined value;
a first mode module including computer-readable instructions stored therein that when executed cause the one or more processors to:
  execute a first mode of a game responsive to the vitality number of the gaming character being greater than the predetermined value;
a second mode module including computer-readable instructions stored therein that when executed cause the one or more processors to:
  execute a second mode of the game responsive to the vitality number of the gaming character being less than or equal to the predetermined value;
a first transmission module including computer-readable instructions stored therein that when executed cause the one or more processors to:
  transmit the vitality number of the gaming character to one or more of the plurality of gaming devices responsive to the vitality number of the gaming character being greater than the predetermined value;
an updating module including computer-readable instructions stored therein that when executed cause the one or more processors to:
  update the vitality number of the gaming character responsive to receiving a damage value of the gaming character from one or more of the plurality of gaming devices and the game being in first mode;
a second transmission module including computer-readable instructions stored therein that when executed cause the one or more processors to:
  transmit a predetermined second vitality number of the gaming character to one or more of the plurality of gaming devices responsive to the vitality number of the gaming character being less than or equal to the predetermined value; and
an updating second module including computer-readable instructions stored therein that when executed cause the one or more processors to constrain updating a predetermined second vitality number of the gaming character based upon the damage value of the gaming character received from one or more of the plurality of gaming devices requesting application to the game.

2. A computer adapted to enable multiple gamer users to fight a gaming character in a virtual game, the computer comprising:
  one or more processors;
  one or more input and output units in communication with the one or more processors and positioned to receive communications; and
  one or more non-transitory mediums in communication with the one or more processors, the one or more non-transitory mediums comprising:
    a management module including computer-readable instructions stored therein that when executed cause the one or more processors to
      manage game information for a virtual game space generated in one or more of a plurality of gaming devices, wherein game information includes a vitality number of the gaming character adapted to act within the virtual game space generated in one or more of the plurality of gaming devices;
    a communication module including computer-readable instructions stored therein that when executed cause the one or more processors to
      communicate with one or more of the plurality of gaming devices;
    an accepting module including computer-readable instructions stored therein that when executed cause the one or more processors to
      process a request for current game information from one or more of the plurality of gaming devices;
    a determination module including computer-readable instructions stored therein that when executed cause the one or more processors to
      determine whether the game information satisfies a predetermined condition;
    a first mode module including computer-readable instructions stored therein that when executed cause the one or more processors to
      execute a first mode of a game responsive to the game information satisfying the predetermined condition;
    a second mode module including computer-readable instructions stored therein that when executed cause the one or more processors to
      execute a second mode of the game responsive to the game information not satisfying the predetermined condition.

3. The computer of claim 2,
wherein the one or more non-transitory mediums further comprise:
  an update module including computer-readable instructions stored therein that when executed cause the one or more processors to
    update the vitality number of the gaming character responsive to receiving a damage value of the gaming character from one or more of the plurality of gaming devices and the game being in first mode.

4. The computer of claim 3, wherein the update module further causes the one or more processors to
  inhibit the update of the vitality number of the gaming character responsive to receiving the damage value of the gaming character from one or more of the plurality of gaming devices and the game being in second mode.

5. The computer of claim 3, wherein the one or more non-transitory mediums further comprise:
  a transmission module including computer-readable instructions stored therein that when executed cause the one or more processors to:
    transmit the vitality number of the gaming character to one or more of the plurality of gaming devices responsive to the game being in second mode.

6. A non-transitory computer medium having computer-readable instructions stored therein that when executed cause one or more processors to
  manage a vitality number of a gaming character adapted to act within a virtual game space generated in one or more of a plurality of gaming devices;
  receive an application to fight the gaming character from one or more of the plurality of gaming devices;
  process an application to fight the gaming character from one or more of the plurality of gaming devices;
  determine whether the vitality number of the gaming character is greater than a predetermined value;

execute a first mode of a game responsive to the vitality number of the gaming character being greater than to the predetermined value;

execute a second mode of the game responsive to the vitality number of the gaming character being less than or equal to the predetermined value;

transmit the vitality number of the gaming character to one or more of the plurality of gaming devices responsive to the vitality number of the gaming character being greater than the predetermined value;

transmit a predetermined second vitality number of the gaming character to one or more of the plurality of gaming devices responsive to the vitality number of the gaming character being less than or equal to the predetermined value; and update is the vitality number of the gaming character responsive to receiving a damage value of the gaming character from one or more of the plurality of gaming devices and the game being in first mode.

7. A non-transitory computer medium as defined in claim 6, wherein the computer-readable instructions further cause the one or more processors to inhibit the update of the vitality number of the gaming character responsive to receiving the damage value of the gaming character from one or more of the plurality of gaming devices and the game being in second mode.

* * * * *